E. L. FREEMAN.
Cultivator-Teeth.

No. 18.174.

Patented Sept. 8, 1857.

UNITED STATES PATENT OFFICE.

EDMUND L. FREEMAN, OF BROWNVILLE, NEW YORK, ASSIGNOR TO HIMSELF AND I. & G. LORD & CO.

IMPROVEMENT IN CULTIVATOR-TEETH.

Specification forming part of Letters Patent No. 18,174, dated September 8, 1857.

*To all whom it may concern:*

Be it known that I, EDMUND L. FREEMAN, of the town of Brownville, county of Jefferson and State of New York, have invented a new and useful Improvement in the Mode of Constructing Cultivator-Teeth; and I hereby declare that the following is a full and exact description, in which—

Figure 1:
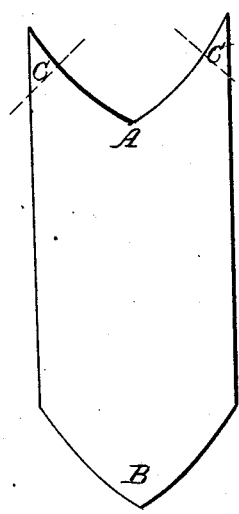
Figure 2:
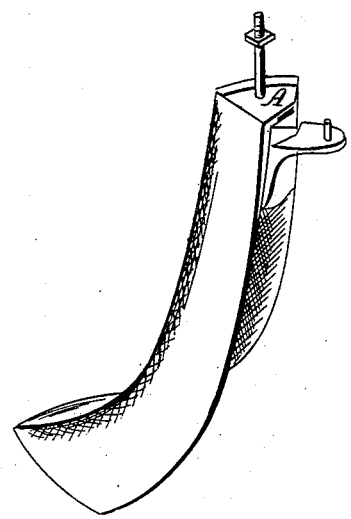
Figure 3:
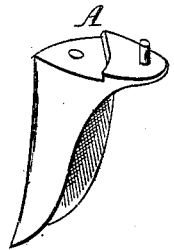
Figure 4:
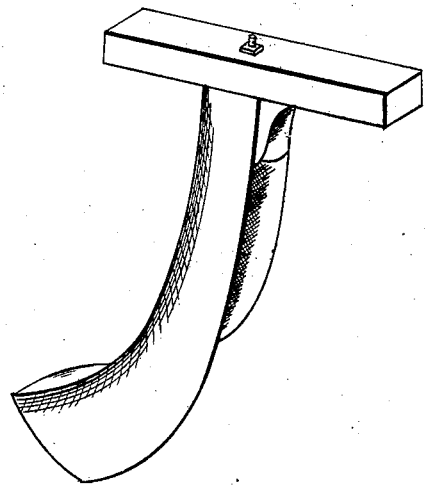

Figure 1 is a plan view of the form cut to shape, from which the tooth is swaged. Fig. 2 is a perspective view of a tooth, showing the lapped head. Fig. 3 is a perspective view of the angular brace, washer, and stay-pin. Fig. 4 is a perspective view of a tooth attached to a beam.

The nature of my invention consists, first, in forming the tooth entire from a thin plate of steel, one end of the pattern-form being rounded and the other hollowed, which is produced by one cutting the plate into two parts, the shape of the rounded and hollowed ends determining the shape or form of the tooth at its cross-section, and also the size of the head, which is lapped, with a hole made through the lap to receive a bolt, the hollowed end being used for the lapped head instead of requiring to be recut to form the point or head of another tooth, as has been done heretofore, and the rounded end forming, when swaged, the point of the tooth; second, an angular brace, washer, and stay-pin, in one piece, separate from the tooth to be used underneath the lapped head instead of on the top, as has been done heretofore, which leaves the whole height of the tooth free to act and less liable to clog, and also forms a support to the head, and serves to strenghten the forward part of the tooth, with a bolt passing through the brace, washer, lapped head, and also the frame to which they are attached, firmly holding the whole to place, the brace, washer, and stay-pin being readily detached and used for new teeth, when required.

To enable others to make and use my invention, I will describe the manner I construct them.

I use sheet-steel of a thickness sufficient for the strength required, of the length of several teeth, and width necessary to form the required width of tooth; and to save the waste of material in cutting the forms to be swaged, I cut them hollowing at one end, as shown at A, Fig. 1, and the other end rounded, as shown at B, Fig. 1, one end exactly fitting its opposite, the rounded end forming, when swaged into shape, the point, and the hollowing end the lapped head A, Fig. 2; and to strengthen the tooth below and where it unites to the frame, I construct an angular brace, washer, and stay-pin, of metal, in one piece, A, Fig. 3, separate from the tooth, to be used underneath the lapped head, and extending toward the point and also back onto the frame to form a broad surface to confine the whole in place to the frame.

I do not claim a metal casting to form a head or stay-pin of the tooth, neither do I claim a bolt for connecting to the frame, as they have long been known and used.

What I claim as my invention, and desire to secure by Letters Patent, is—

1. A lapped-headed cultivator-tooth, A, Fig. 2, made in the manner substantially as herein described.

2. A brace, washer, and stay-pin, in one piece, underneath the head, substantially as described, for the purposes set forth.

EDMUND L. FREEMAN.

Witnesses:
HENRY LAWRENCE,
J. P. DAVISON.